Patented June 10, 1947

2,422,106

UNITED STATES PATENT OFFICE 2,422,106

SANTONIN-PHENOTHIAZINE VERMIFUGE

Raymond E. Lubbehusen, Webster Groves, Mo., assignor to Ralston Purina Company, St. Louis, Mo., a corporation of Missouri No Drawing. Application March 20, 1943, Serial No. 479,878

1 Claim. (Cl. 167—53)

This invention relates to an anthelmintic particularly for the removal of round worms (ascarids) from swine. Field experience over a period of years has clearly demonstrated that a great majority of farm reared pigs are infested with large round worms, and since it has been estimated that pigs so infested require 40% more feed to produce the same market weight as parasite-free pigs, an effective treatment for removing these worms avoids great economic loss to hog raisers.

For some years it has been known that santonin (a drug derived from the unexpanded flowerheads of *Artemisia pauciflora*) is effective for the removal of a substantial portion (approximately 65%) of round worms. Farmer's Bulletin No. 1787 issued by the United States Department of Agriculture states that "santonin, for a long time regarded as an effective remedy for the removal of round worms from swine, and commonly recommended for this purpose, is not very effective in the doses which have been usually recommended. When santonin is administered in relatively large doses, one-sixth to two-thirds grain per pound of body weight followed in twelve hours by one gram of Epsom salts per pound of body weight, a large percent of ascarids is removed." However, since the present price of santonin is approximately $200.00 per kilogram, the cost per dose is quite high and it is, therefore, not being very generally used.

In 1939 the United States Department of Agriculture announced results of its experiments with phenothiazine as an anthelmintic, stating that in suitable doses it removed a large percentage of nodular worms and a smaller percentage of ascarids in swine. It reported that the drug was more effective for the removal of ascarids in pigs which were infested with large numbers of these worms than from those which harbored only a few. The dosage recommended was 8 grams for pigs weighing from 25 to 50 pounds, and 12 grams for those weighing from 50 to 100 pounds.

I have conducted extensive experiments as to the effectiveness of phenothiazine for the removal of ascarids with the result that I found there is no appreciable difference in the effectiveness of dosages of 4, 6, 8 or 12 grams administered to pigs with a body weight of 30 to 65 pounds and that while phenothiazine is highly efficient for the removal of nodular worms, it is not a satisfactory vermifuge for the removal of ascarids since its administration never resulted in the removal of more than 38%.

Extensive experiments with the use of santonin alone demonstrated that the minimum dosage for pigs with a weight range of 30 to 65 pounds is 4 grains but that this dosage as well as dosages of 8 grains, result in only about 65% to 70% efficiency as to ascarid removal.

In my experimental search for an effective vermifuge for round worms which would be of reasonable cost, I made the discovery that phenothiazine and santonin are synergistic and that a single dosage for pigs in the weight range of 30 to 65 pounds consisting of 4 grams of phenothiazine and 1.25 grains of santonin caused the removal of 90 to 100% of ascarids. This result was confirmed by field trials in several states on several thousand pigs. Thus I have secured results much superior to those secured by the maximum recommended dose of santonin alone although using in the dose according to my new formula only one-fourth of the minimum amount of santonin required for 65% efficiency when used alone.

While I do not know the nature thereof, it is obvious from the fact that 4 grams of phenothiazine administered alone has a very minor effect on the removal of ascarids, and the use of one and one-fourth grains of santonin alone has very little, if any, effect, that these drugs are unquestionably synergistic when administered together. My experiments also indicate that there is very little difference in the result if the quantity of santonin employed in the formula varies from 1 grain up to 2 grains. The amount of phenothiazine in the formula may be increased without altering the efficiency thereof for the removal of ascarid worms, but unless additional phenothiazine is desired on account of its excellent efficiency as to the removal of nodular worms, it is naturally preferable to use only approximately 4 grams of phenothiazine, whereby the size of the tablet may not be such as to increase the difficulty of administration.

It will be understood that all references herein to dosage are on the basis of securing the desired result by means of a single dose, and since the dose may be administered in compressed tablet or capsule or other forms, I have, in the claims, referred to a single ascaricide dose as being a "unit." For hogs over 65 pounds to be treated the single dose should be one and a half to two or more times the amount herein set forth for pigs under 65 pounds, and determined in accordance with the weight of the animal. I prefer to incorporate in the dosage unit a suitable quantity of a laxative, such as phenolphthalein, but the use of the units with and without the laxative ingredient demonstrates that the latter does not contribute to the effect of the phenothiazine and santonin in causing release of worms from the animal for natural or laxative accelerated expulsion.

Having fully described my invention, what I claim as new and desire to secure by Letters Patent of the United States is:

A vermifuge unit for administration to pigs of body weight in the range of 35 to 65 pounds to effect removal of ascarid worms, the ascaricide ingredients of said unit being approximately 1¼ grains of santonin and not less than 4 grams of phenothiazine.

RAYMOND E. LUBBEHUSEN.

REFERENCES CITED

The following references are of record in the file of this patent:

Du Pont Magazine, Oct. 1940, page 10.

Winslow, Veterinary Materia Medica (1919), pages 437, 438.

Moskey et al., American Journal of Veterinary Research, vol. 2, page 55 (1941).